United States Patent Office.

JAMES A. MAYNARD, OF NEWTONVILLE, MASSACHUSETTS.

Letters Patent No. 108,612, dated October 25, 1870.

IMPROVEMENT IN HUBS FOR CARRIAGES.

The Schedule referred to in these Letters Patent and making part of the same.

*To all whom it may concern:*

Be it known that I, JAMES A. MAYNARD, of Newtonville, in the county of Middlesex and State of Massachusetts, have invented certain Improvements in Carriage and Car-Wheels and Axle-Boxes, and in the method of securing them together, of which the following is a full, clear, and exact description, reference being had to the accompanying drawing making part of this specification, in which—

Figure 1 is a perspective view of one-half of an axle-box of my improved construction.

Figure 2 is a perspective view of the portion of the wheel which receives the axle-box.

Figure 3 is a longitudinal section through a portion of the wheel, with the axle-box and elastic packing applied thereto.

My invention relates to that class of wheels in which rubber, or other elastic substance is employed to relieve the concussion and diminish the wear, and consists in the peculiar construction of the axle-box or portion of the wheel to which the axle is secured, and in the manner in which it is applied to the wheel, whereby the elastic packing is compressed tightly into place, and securely held as required.

To enable others skilled in the art to understand and use my invention I will proceed to describe the manner in which I have carried it out.

In the said drawing—

A represents a portion of a wheel, the interior, 4, of which is provided with longitudinal grooves, $a$, placed at equal distances apart.

This portion A of the wheel is for the reception of the axle-box, or central portion B of the wheel, to which the axle is secured, and between the axle-box and the interior of the portion A of the wheel is a packing, $b$, of rubber, or other suitable elastic material, the diameter of the axle-box B being less than that of the opening through the wheel, so as to afford the necessary space for the packing.

The axle-box B is made in two portions, each of which is provided with a flange, $c$, and these flanges serve to close the opening 4 through the wheel on both sides, and thus confine the elastic packing $b$ securely in place within the wheel, as required, the length of each portion of the box being such that their inner ends will not come into contact with each other.

Each half of the axle-box is made conical or tapering from the flange $c$ to its inner end, and is provided with a number of projecting ribs or bars, $d$, corresponding to the number of grooves $a$ in the wheel.

The outer faces 6 7 of the ribs or bars $d$ taper longitudinally, and the faces 7 are also inclined outward toward the axle-box, by which construction, when the two portions of the axle-box are forced in from opposite sides of the wheel, the elastic packing $b$, which has been previously inserted, and which is of greater thickness than the space between the axle-box and the interior of the wheel, will be wedged or compressed tightly on all sides, and held firmly in place, as required; while the ribs or bars $d$, which fit into the grooves $a$, serve as clutches, to prevent the axle-box from turning around within the wheel.

The two portions of the axle-box are intended to be forced simultaneously into the wheel from opposite sides by screws, hydrostatic pressure, or other suitable means.

By thus making the axle-box in two pieces I am enabled to dispense with a removable flange at one end, while the packing can be of equal thickness at each end of the box, and, as the inner end of the two portions do not come in contact with each other, a space is afforded for the rubber, which thus increases the capability of the box to yield gradually when subjected to lateral shocks, advantages which could not be secured were the axle-box made tapering in one piece.

Instead of placing a packing of vulcanized rubber within the wheel, and then forcing in the two portions of the axle-box, as above described, the axle-box may be placed within the wheel and held centrally in its proper position by pins, or otherwise, and the rubber packing, in a soft semi-liquid or plastic state, be forced, through an opening or openings provided for the purpose, into the space between the box B and the interior of the wheel A, and afterward vulcanized by subjecting it to the required degree of heat, in a well-known manner. I prefer to use, for the purpose of forcing the rubber into place, a cylinder, surrounded by a steam-jacket, and provided with a plunger; other methods may, however, be employed.

I do not confine myself to the use of a rubber packing, as a packing of wood, or other suitable elastic material may be employed, if preferred.

*Claim.*

What I claim as my invention, and desire to secure by Letters Patent, is—

The axle-box or central portion B of the wheel, made in two parts, each tapering, and provided with a flange, $c$, and ribs $d$, in combination with the wheel A, with its grooves $a$, and the elastic packing $b$, all constructed and operating substantially as described.

Witness my hand this 1st day of September, A. D. 1870.

JAS. A. MAYNARD.

Witnesses:
P. E. TESCHEMACHER,
N. W. STEARNS.